United States Patent [19]

Kobayashi et al.

[11] Patent Number: 5,025,764
[45] Date of Patent: Jun. 25, 1991

[54] LUBRICANT OIL AMOUNT DETECTOR OF A VERTICAL SHAFT TYPE ENGINE

[75] Inventors: Kazuyuki Kobayashi; Kouji Takahashi, both of Nagoya, Japan

[73] Assignees: Mitsubishi Jukogyo Kabushiki Kaisha, Tokyo; Churyo Engineering Kabushiki Kaisha, Aichi, both of Japan

[21] Appl. No.: 507,853

[22] Filed: Apr. 12, 1990

[51] Int. Cl.⁵ .............................................. F02B 77/00
[52] U.S. Cl. ........................... 123/198 R; 123/196 R; 184/96; 184/6.4; 56/229
[58] Field of Search ........ 123/179 SE, 196 W, 196 R, 123/198 R; 184/6.18, 6.4, 96; 56/229

[56] References Cited

U.S. PATENT DOCUMENTS

| | | | |
|---|---|---|---|
| 2,304,644 | 12/1942 | Heftler | 184/96 |
| 3,983,958 | 10/1976 | Swearingen | 184/96 |
| 4,133,287 | 1/1979 | Downs | 60/534 |

FOREIGN PATENT DOCUMENTS 1368562  1/1988  U.S.S.R. ............................... 184/6.4

Primary Examiner—E. Rollins Cross
Attorney, Agent, or Firm—Wenderoth, Lind & Ponack

[57] ABSTRACT

An improved lubricant oil amount detector in an oil pouring device of a vertical shaft type engine includes an oil passageway provided in an oil pan side portion of a crank case cover, an oil pipe molded of transparent resin and communicating with the oil passageway and a cover bearing level marks corresponding to upper and lower limits of an engine lubricant oil amount, assembled around the outer circumference of the oil pipe and having a small window for facilitating inspection opened therein. Instead of the above-mentioned oil pipe and cover, an oil pipe molded of resin and communicating with the oil passageway, and a small window provided in a part of the same oil pipe and molded of transparent nylon, PBT, which has level marks corresponding to upper and lower limits of an engine lubricant oil amount integrally molded thereon, can be employed.

6 Claims, 3 Drawing Sheets

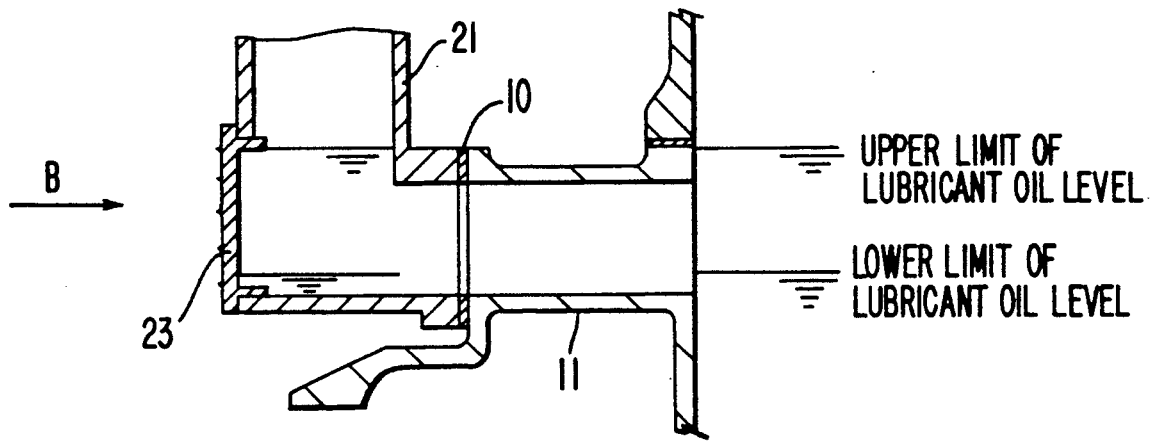
FIG. 4
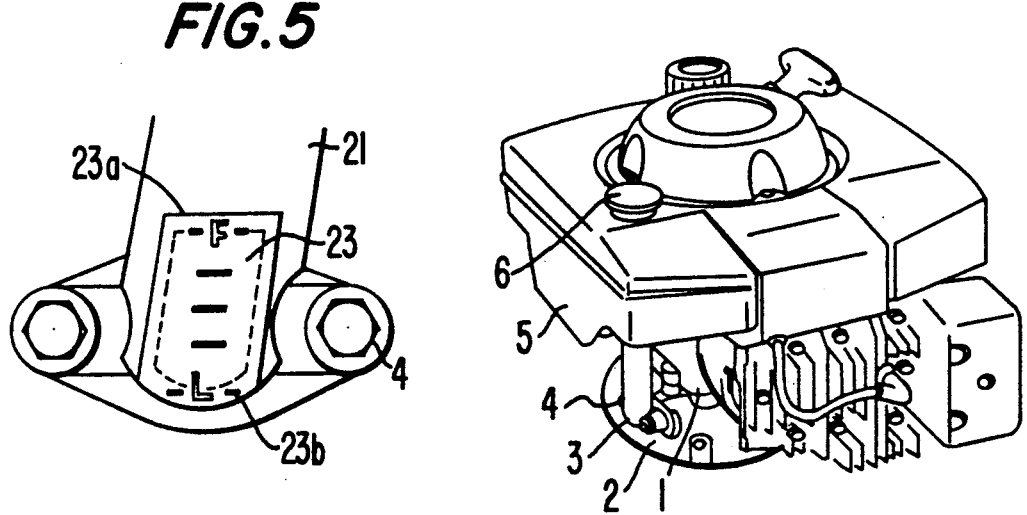
FIG. 5
FIG. 6 (PRIOR ART)

LUBRICANT OIL AMOUNT DETECTOR OF A VERTICAL SHAFT TYPE ENGINE

BACKGROUND OF THE INVENTION

1. Field of the Invention

The present invention relates in general to a lubricant oil amount detector provided in an oil pipe in which lubricant oil is to be poured, and which is applicable to a vertical shaft type general-purpose engine to be loaded on a lawn mower or the like.

2. Description of the Prior Art

At first, the above-mentioned type of oil pipe in the prior art will be described with reference to FIGS. 6 to 8. As shown in these figures, an oil pipe 3 of a vertical shaft type engine in the prior art is fastened to a crank case cover 2 with a packing 10 pinched therebetween by means of bolts 4 or the like. The crank case cover 2 is provided with an oil passageway 11, and the level of lubricant oil of the engine and the level of oil within the oil pipe 3 are kept identical.

In addition, for the purpose of facilitating the pouring of lubricant oil when the engine is mounted on a lawn mower or the like, the oil pipe 3 has its pouring portion disposed above an upper surface of a fuel tank 5, and an oil cap 6 equipped with an oil gauge 6a is fitted in the oil pipe 3 by an easily detachable structure such as screw threads or the like.

Upon using the engine such as during normal lawn mowing work, before the engine is turned on an amount of lubricant oil is checked, and at that time, as shown in FIG. 8, the oil cap 6 is disengaged from the oil pipe 3 and the level of lubricant oil adhered to the oil gauge 6a equipped on the oil cap 6 is visually confirmed.

However, the above-described oil amount detector has shortcomings in that the confirmation of the oil amount is relatively troublesome, and hence, the seizure of an engine due to a shortage in oil caused by forgetting to inspect the oil amount occurs. Or, on the contrary, until a user is able to determine the consumption of lubricant oil of an engine as a matter of experience, unnecessarily frequent inspections have to be carried out.

Furthermore, since one end of an oil pipe is disposed above the top surface of a tank 5, which surface is located higher than an upper limit of the lubricant oil amount, in order to facilitate the pouring of oil into the pipe, an excessive pouring of lubricant oil can hardly be prevented. Therefore, the pouring and supplementing of a proper amount of lubricant oil is usually done by relying upon one's sense and experience.

SUMMARY OF THE INVENTION

It is therefore one object of the present invention to provide a lubricant oil amount detector of a vertical shaft type engine, which facilitates inspection of the lubricant oil amount merely through visual confirmation without necessitating a withdrawal of an oil gauge as is the case with the lubricant oil amount detector in the prior art.

According to one feature of the present invention, there is provided a lubricant oil amount detector of a vertical shaft type engine, comprising an oil passageway provided in an oil pan side portion of a crank case cover, an oil pipe molded of transparent resin such as nylon, PBT, etc. and communicating with the oil passageway, and a cover bearing level marks corresponding to upper and lower limits of an engine lubricant oil amount, assembled around the outer circumference of the oil pipe and having a small window for facilitating inspection opened therein.

According to another feature of the present invention, there is provided a lubricant oil amount detector of a vertical shaft type engine, comprising an oil passageway provided in an oil pan side portion of a crank case cover, an oil pipe molded of resin such as nylon, PBT, etc. and communicating with the oil passageway, and a small window provided in a part of the oil pipe, molded of transparent nylon such as PBT, and having level marks corresponding to upper and lower limits of an engine lubricant oil amount integrally molded thereon.

In essence, the lubricant oil amount detector of a vertical shaft type engine according to the present invention is different than the lubricant oil amount detector in the prior art in that (1) an oil pipe molded of transparent resin such as nylon, PBT, etc. is assembled with and covered by a cover consisting of a colored cylindrical body molded of the same material or PE, PP, etc. having a lower Young's modulus than the oil pipe partly provided with a small window for facilitating the inspection of a lubricant oil amount, or (2) a transparent small window for facilitating inspection of a lubricant oil amount and molded of resin such as nylon, PBT, etc. is welded by supersonic welding, etc. to a part of an oil pipe molded of resin such as nylon, PBT, etc.

According to the present invention, owing to the above-described structural features, when inspecting an engine, the inspection of the lubricant oil amount can be done easily by visual confirmation through the small window provided on the oil pipe or on the oil pipe cover without the need to withdraw and insert a separate oil gauge. Accordingly, engine troubles caused by a shortage or excessive pouring of lubricant oil can be prevented.

The above-mentioned and other objects, features and advantages of the present invention will become more apparent by referring to the following description of preferred embodiments of the invention taken in conjunction with the accompanying drawings.

BRIEF DESCRIPTION OF THE DRAWINGS

In the accompanying drawings:

FIG. 4 is a vertical cross-sectional view of an essential part of a second preferred embodiment of the present invention;

FIG. 5 is a side view of the essential part as viewed in the direction of arrow B in FIG. 4;

FIG. 6 is a perspective view of a vertical shaft type general-purpose engine in the prior art;

DETAILED DESCRIPTION OF THE PREFERRED EMBODIMENTS

Figure 3:
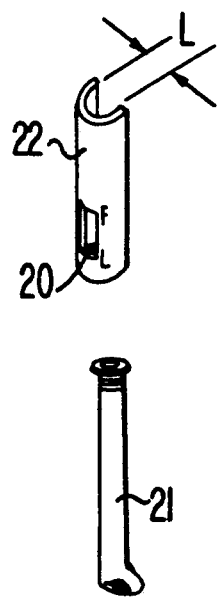
FIG. 3 is an exploded perspective view of an oil pipe 21 and an oil pipe cover 22 shown in FIG. 1.

In the following, the first preferred embodiment of the present invention will be described with reference to FIGS. 1 to 3.

Figure 1:
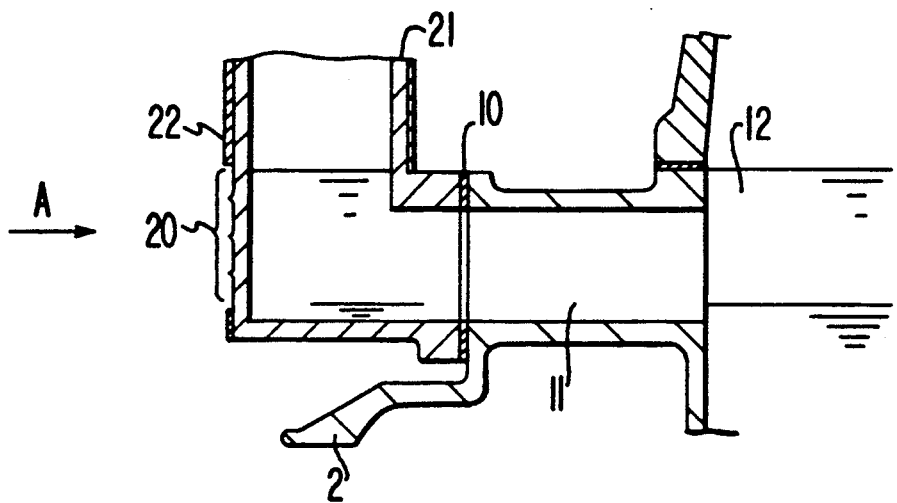
FIG. 1 is a vertical cross-sectional view of an essential part of a first preferred embodiment of the present invention.
Figure 2:
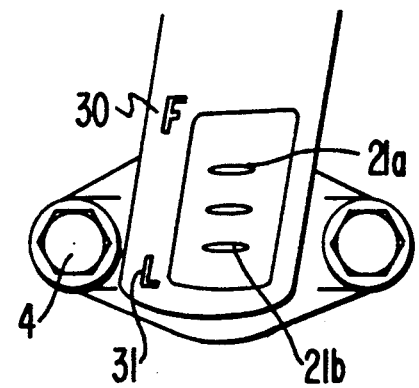
FIG. 2 is a side view as viewed in the direction of an arrow A in FIG. 1.
Figure 7:
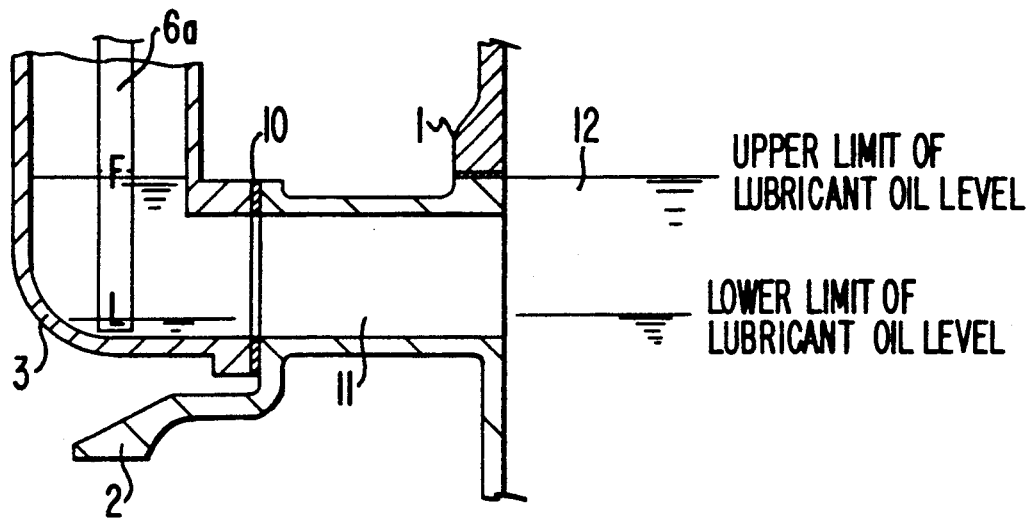
FIG. 7 is a vertical cross-sectional view of an oil amount detector portion of the engine in FIG. 6.
Figure 8A:
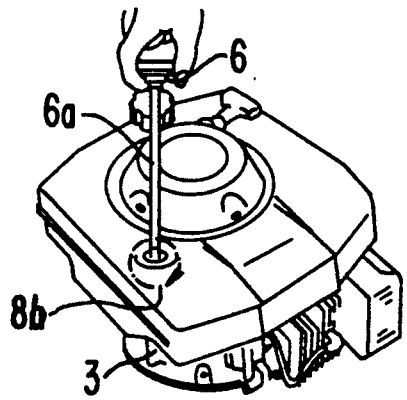
FIG. 8a is a perspective view of the engine shown in FIGS. 6 and 7.
Figure 8B:
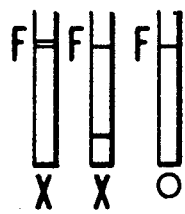
FIG. 8b is a schematic diagram illustrating the inspection of oil in the engine of FIGS. 6 and 7.

In FIG. 1, an oil pipe 21 connected with an oil passageway 11 in a crank case cover 2 is molded of transparent resin material having a heat-resistant property such as, for example, nylon, PBT, etc., and scales 21a and 21b serving as an oil gauge are embossed on the pipe during molding. Since the oil pipe 21 is transparent, in order to prevent the stirring state of lubricant oil during operation of the engine from being viewed, and to effect a coloring balance with a fuel tank 5 and a cylinder block 1, a cover 22 molded of resin material colored black, grey, or the like, such as, for example, the same nylon, PBT, etc. material as the pipe 21 or resin material exhibiting oil resistance such as PE, PP, etc. is assembled over pipe 21.

The method by which the cover 22 is assembled with the pipe 21 employs a fastening biasing force provided by a notch L in one part of the cover 22. Furthermore, the cover 22 is provided with an opening portion 20 serving as a small window for allowing the lubricant oil amount to be inspected. Embossed level marks 30 and 31 serving as lubricant oil gauges are integrally molded with cover 22. The gauges after assembly of the cover 22 are positioned so as to correspond to upper and lower limits of a lubricant oil amount of the engine. Furthermore, the oil pipe 21 is fastened to the crank case cover 2 with a packing 10 pinched therebetween by means of bolts 4.

While the invention has been described with respect to the case where the colored cover 22 was molded of resin, even if an opening portion 20 is formed in a painted thin steel sheet member and fastened to the pipe 21 by means of the bolts 4 or the like, the effect and advantages are quite the same.

SECOND PREFERRED EMBODIMENT

Next, the second preferred embodiment of the present invention will be described with reference to FIGS. 4 and 5.

Referring now to FIG. 4 which shows a vertical cross section of an oil pipe 21 having a small window 23, an oil pipe 21 colored black or the like and connected with an oil passageway 11 in a crank case cover 2 is fastened to the crank case cover 2 with a packing 10 pinched therebetween by means of bolts 4 or the like. A transparent small window 23 which is molded of resin such as nylon, PBT, etc. is welded by supersonic welding or the like to the oil pipe 21 which is also molded of resin such as nylon, PBT, etc. In addition, level marks 23a and 23b corresponding to upper and lower limits of a lubricant oil amount of an engine are integrally formed on the small window 23 by embossing.

It is to be noted that while a small window 23 which is welded by supersonic welding has been described in the preferred embodiment above, even if the oil pipe 21 is molded by double-color integral molding of resin such as nylon, PBT, etc. so as to make the small window portion transparent and the pipe portion colored black or the like, the effects and advantages are quite the same.

As will be obvious from the detailed description of the preferred embodiments of the present invention above, the effects and advantages brought about by the present invention are as follows.

(1) Owing to the fact that a lubricant oil amount detector in an oil pouring device of a vertical shaft type engine loaded on a lawn mower or the like comprises an oil passageway provided in an oil pan side portion of a crank case cover, an oil pipe molded of transparent resin such as nylon, PBT, etc. and communicating with the oil passageway, and a cover bearing level marks corresponding to upper and lower limits of an engine lubricant oil amount, assembled around the outer circumference of the oil pipe and having a small window for facilitating inspection opened therein, the following effects and advantages are brought about.

Since a lubricant oil amount of an engine can be easily confirmed without necessitating the disassembling and assembling of parts such as an oil gauge or the like, seizure of an engine caused by a shortage of oil can be prevented.

Moreover, when adding lubricant oil to the engine, since the amount of poured oil can be visually monitored without a loss in the ease in which such oil can be poured, engine troubles such as breather oil spouting causing by excessive pouring of oil can be prevented.

In addition, as compared to the structure in which an oil pipe is made to be entirely transparent, the stirring of oil during operation of an engine would not be unnecessarily seen, and the coloring balance effected with a tank, a cylinder block and the like would not be unaesthetic.

(2) Alternatively, owing to the fact that a lubricant oil amount detector in an oil pouring device of a vertical shaft type engine loaded on a lawn mower or the like comprises an oil passageway provided in an oil pan side portion of a crank case cover, an oil pipe molded of resin such as nylon, PBT, etc. and communicating with the oil passageway, and a small window provided in a part of the oil pipe and molded of transparent nylon, PBT, etc. which has level marks corresponding to upper and lower limits of an engine lubricant oil amount integrally molded thereon, the following effects and advantages are brought about.

Since a lubricant oil amount of an engine can be easily confirmed without necessitating the disassembling and assembling of parts such as an oil gauge or the like, seizure of an engine caused by a shortage of oil can be prevented.

Moreover, when adding lubricant oil to the engine, since the amount of poured oil can be visually monitored without a loss in the ease in which such oil can be poured, engine troubles such as breather oil spouting caused by excessive pouring of oil can be prevented.

While a principle of the present invention has been described above in connection with preferred embodiments of the invention, it is intended that all matter contained in the above description and shown in the accompanying drawings shall be interpreted to be illustrative and not in a limiting sense.

What is claimed is:

1. A lubricant oil amount detector in an oil accommodating section of a vertical shaft type engine to be mounted on a lawn mower or the like, comprising: an oil passageway provided in an oil pan side portion of a crank case cover, an oil pipe molded of transparent resin such as nylon or PBT and communicating with said oil passageway, and a cover bearing level marks corresponding to upper and lower limits of an engine lubricant oil amount, said cover disposed around the outer circumference of said oil pipe and having a small window extending therethrough over said level marks for facilitating inspection of the lubricant oil amount.

2. A lubricant oil amount detector in an oil accommodating section of a vertical shaft type engine as claimed in claim 1, wherein said cover is colored.

3. A lubricant oil amount detector in an oil accommodating section of a vertical shaft type engine to be mounted on a lawn mover or the like, comprising: an oil passageway provided in an oil pan side portion of a crank case cover, an oil pipe molded or resin such as nylon or PBT and communicating with said oil passageway, and a small window provided in a part of said oil pipe and molded of transparent nylon such as PBT, said window having level marks corresponding to upper and lower limits of an engine lubricant oil amount integrally molded thereon.

4. A lubricant oil amount detector in an oil accommodating section of a vertical shaft type engine as claimed in claim 3, wherein said oil pipe is colored.

5. A lubricant oil amount detector in an oil accommodating section of a vertical shaft type engine as claimed in claim 3, wherein said small window is welded to said oil pipe with a supersonic weld.

6. A lubricant oil amount detector in an oil accommodating section of a vertical shaft type engine as claimed in claim 3, wherein said oil pipe and said small window are integrally molded.

* * * * *